(12) United States Patent
Fontanesi et al.

(10) Patent No.: US 10,473,679 B2
(45) Date of Patent: Nov. 12, 2019

(54) ROTATIONAL PHASE DETECTION SYSTEM

(71) Applicant: Infineon Technologies AG, Neubiberg (DE)

(72) Inventors: Simone Fontanesi, Villach (AT); Tobias Werth, Villach (AT); Peter Alfred Friessnegger, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 34 days.

(21) Appl. No.: 15/950,642

(22) Filed: Apr. 11, 2018

(65) Prior Publication Data

US 2019/0317120 A1    Oct. 17, 2019

(51) Int. Cl.
  *G01P 3/44*     (2006.01)
  *G01D 5/16*     (2006.01)
  *G01D 5/14*     (2006.01)

(52) U.S. Cl.
  CPC .............. *G01P 3/44* (2013.01); *G01D 5/145* (2013.01); *G01D 5/16* (2013.01)

(58) Field of Classification Search
  CPC ................................ G01D 5/145; G01D 5/16
  See application file for complete search history.

(56) References Cited

U.S. PATENT DOCUMENTS

| 2003/0151404 | A1* | 8/2003 | Lescourret | G01R 33/02 324/228 |
| 2006/0181271 | A1* | 8/2006 | Lescourret | F41G 3/225 324/207.17 |
| 2012/0272740 | A1* | 11/2012 | Takahashi | G01H 1/003 73/660 |

* cited by examiner

*Primary Examiner* — Giovanni Astacio-Oquendo
*Assistant Examiner* — Alvaro E Fortich
(74) *Attorney, Agent, or Firm* — Harrity & Harrity, LLP

(57) ABSTRACT

Some examples described herein may include receiving, by a sensor device, differential measurement signals from at least two sensor elements; generating, by the sensor device, fixed-calibrated channels from the differential measurement signals, generating, by the sensor device, self-calibrated channels from the differential measurement signals; determining, by the sensor device, offsets associated with the differential measurement signals based on the self-calibrated channels; determining, by the sensor device, whether a vibration occurred within the differential measurement signals based on the fixed-calibrated channels; and providing, by the sensor device, phase measurement information based on the offsets and whether the vibration occurred, wherein the phase measurement information identifies a phase of the rotatable object.

20 Claims, 5 Drawing Sheets

ROTATIONAL PHASE DETECTION SYSTEM

BACKGROUND

Magnetic speed sensors can be used to determine rotational speed and/or direction of rotating objects (e.g., wheels, gears, shafts, and/or the like). The magnetic speed sensors can include sensor elements and/or control circuitry to process measurements from the sensor elements. The processed measurements can be used to determine a rotational speed and/or direction of the rotating objects.

SUMMARY

According to some implementations, a sensor device may include a first sensor element to sense a magnetic field associated with a rotatable object; a second sensor element to sense the magnetic field; and a sensor controller, communicatively coupled to the first sensor element and the second sensor element, to: receive a first measurement signal from the first sensor element; receive a second measurement signal from the second sensor element; generate a first fixed-calibrated channel from the first measurement signal; generate a second fixed-calibrated channel from the second measurement signal; generate a first self-calibrated channel from the first measurement signal; generate a second self-calibrated channel from the second measurement signal; determine an offset associated with the first measurement signal and an offset associated with the second measurement signal based on the first self-calibrated channel and the second self-calibrated channel, respectively; determine whether a vibration occurred based on the first fixed-calibrated channel or the second fixed-calibrated channel; and provide phase measurement information based on the offset associated with the first measurement signal, the offset associated with the second measurement signal, and whether the vibration occurred, wherein the phase measurement information indicates a phase of the rotatable object.

According to some implementations, system may include a sensor device that includes a first sensor element configured to sense a magnetic field associated with a magnet and a rotatable object, wherein the first sensor element is configured to generate a first measurement signal based the sensed magnetic field; a second sensor element, configured to measure the magnetic field associated with the magnet and the rotatable object, wherein the second sensor element is configured to generate a second measurement signal based on the sensed magnetic field, wherein the second measurement signal is phase shifted relative to the first measurement signal; and a sensor controller configured to: receive the first measurement signal from the first sensor element; receive the second measurement signal from the second sensor element; generate a first fixed-calibrated channel from the first measurement signal; generate a second fixed-calibrated channel from the second measurement signal; generate a first self-calibrated channel from the first measurement signal; generate a second self-calibrated channel from the second measurement signal; determine an offset associated with the first measurement signal and an offset associated with the second measurement signal based on the first self-calibrated channel and the second self-calibrated channel, respectively; determine whether a vibration occurred based on the first fixed-calibrated channel or the second fixed-calibrated channel; and generate phase measurement information based on the offset associated with the first measurement signal, the offset associated with the second measurement signal, and whether the vibration occurred in the first measurement signal or the second measurement signal, wherein the phase measurement information indicates a phase of the rotatable object; and an electronic control unit configured to determine the phase of the rotatable object based on the phase measurement information.

According to some implementations, a method may include receiving, by a sensor device, differential measurement signals from at least two sensor elements, wherein the differential measurement signals correspond to measurements of a magnetic field and are phase-shifted to indicate a direction of rotation of a rotatable object; generating, by the sensor device, fixed-calibrated channels from the differential measurement signals, generating, by the sensor device, self-calibrated channels from the differential measurement signals; determining, by the sensor device, offsets associated with the differential measurement signals based on the self-calibrated channels; determining, by the sensor device, whether a vibration occurred within the differential measurement signals based on the fixed-calibrated channels; and providing, by the sensor device, phase measurement information based on the offsets and whether the vibration occurred, wherein the phase measurement information identifies a phase of the rotatable object.

DETAILED DESCRIPTION

Figure 1A:
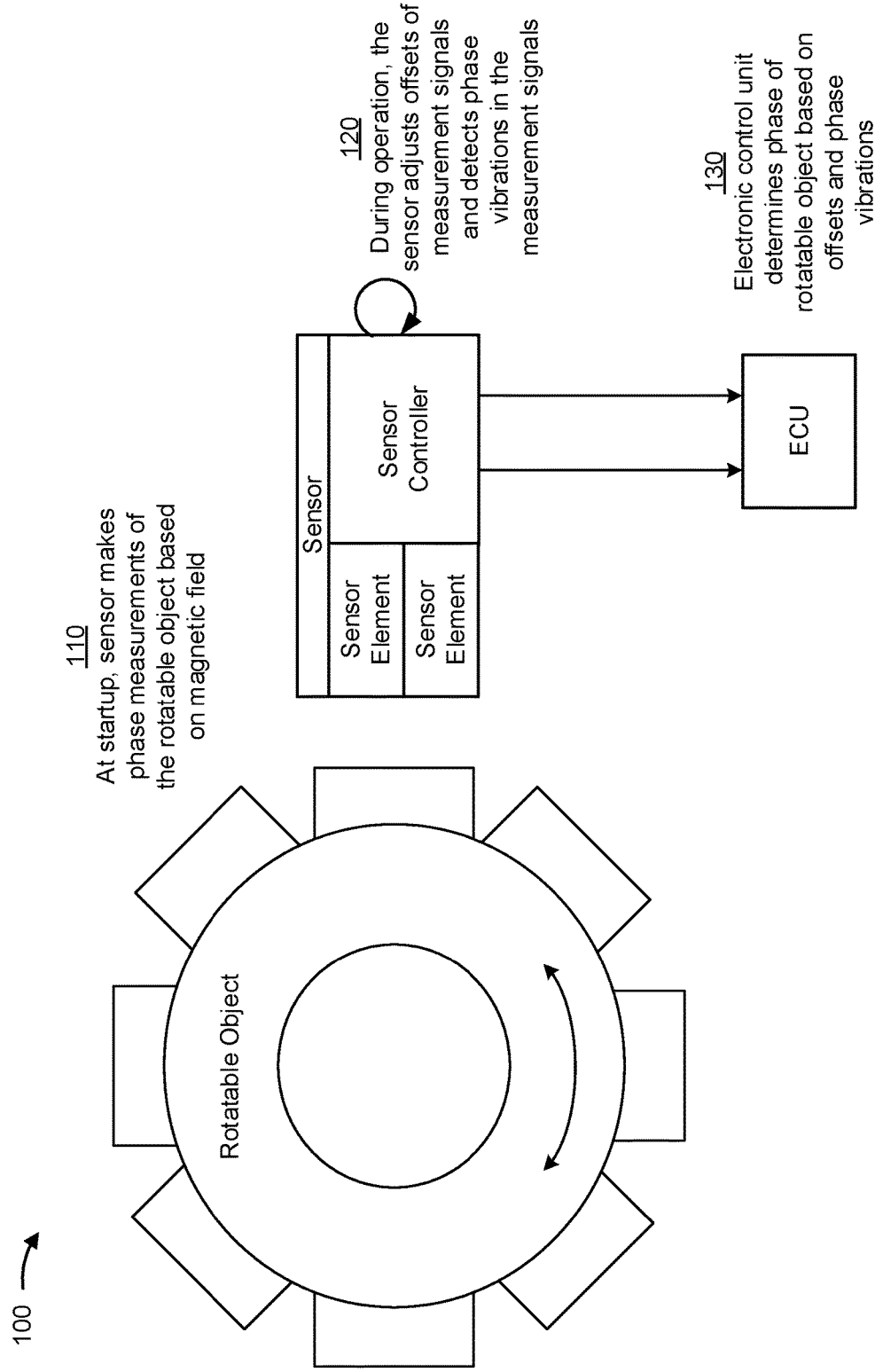
FIGS. 1A and 1B are diagrams of an overview of an example implementation described herein.

The following detailed description of example implementations refers to the accompanying drawings. The same reference numbers in different drawings may identify the same or similar elements.

In many instances, a sensor (e.g., a speed sensor, a rotational angle sensor, a turn count sensor, and/or the like) includes at least two sensor elements (e.g., two sensor elements that generate phase shifted signals) to determine a speed and/or direction of rotation of a rotatable object based on a magnetic field associated with the rotatable object. For example, a magnet may be configured on or near the rotatable object, and changes in the magnetic field, caused by the rotatable object rotating and sensed by the sensor elements, indicate the speed and/or direction of rotation of the rotatable object. Often times, vibrations or sensed vibrations of a sensor (e.g., relative to a configured position to measure the speed and/or direction of the rotatable object) can cause the sensor to inaccurately determine a phase or position of the rotating object. In some instances, the vibrations can be sensed and accounted for by the sensor. However, while one of the sensor elements may be affected by or may sense a vibration, another may not be, which can cause errors when determining the phase of the rotatable object. Additionally, vibrations may be sensed by an improperly calibrated sensor. For example, in some instances, upon startup (e.g., when the sensors are activated and/or powered on), an initial sensed phase of the rotatable object may be inaccurate due to errors in the calibration, errors in placement of the sensor, lack of accounting for an offset of the sensor elements (e.g., from a threshold crossing level of an analog-digital-converter (ADC) signal from the sensor elements), and/or the like.

In some instances, sensors may use self-calibrating techniques to account for offsets identified during operation to provide relatively accurate phase detection (once calibrated). For example, a self-calibrated sensor can detect a location of a threshold crossing level (e.g., corresponding to a bias of a signal) of an ADC signal from the sensor elements based on measured maxima and minima of an amplitude of a signal associated with the magnetic field. However, these sensors are sensitive to vibrations (which affect the maxima and minima) and can be relatively ineffective in detecting or accounting for vibrations because the vibrations affect the recalibration of the sensors. Some sensors may be fixed-calibrated sensors that use a fixed threshold as a threshold crossing level of the ADC signal. The fixed-calibrated sensors can be robust against vibrations (e.g., because crossings of the signal at the fixed threshold are monitored rather than maximum and minima of the signal), but can relatively inaccurate when measuring the phase of the rotating object (e.g., because an offset between the maxima and/or minima from the fixed threshold is not considered).

Some implementations described herein provide a sensor that processes fixed-calibrated channels and self-calibrated channels from the sensor elements to account for detected offsets and/or vibrations during operation of the sensor and/or during rotation of a rotatable object. Accordingly, an example sensor provided herein can benefit from advantages of fixed-calibrated sensors (e.g., robustness against vibrations) and advantages of self-calibrated sensors (e.g., accuracy in determining phase) to account for vibrations and offsets associated with the sensor elements of the sensor. For example, self-calibrated channels may be used to determine an offset in fixed-calibrated channels. The offset may be applied to the fixed-calibrated channels to increase the phase detection accuracy of the fixed-calibrated channels. Furthermore, direction information and amplitude information from fixed-calibrated channels may be used to detect vibrations. If vibrations are detected, the offset, as included within the self-calibrated channels, may not be adjusted in the fixed-calibrated channels so as not to make an adjustment on false maximum or minimum amplitudes of the signals that were used to determine the offset in the self-calibrated channels, but were caused by the vibrations. Accordingly, a vibration analysis is to be performed during operation (e.g., while the rotatable object is rotating) that can account for sensed vibrations and offsets of the sensor elements to provide real-time phase measurement information during operation and that can be saved to enable initial phase detection upon startup.

Furthermore, electrical events from the self-calibrated channels (e.g., when maximum or minimum amplitudes of the measurement signal occur) can be used to prevent deadlock situations on the fixed-calibrated channels. For example, if one of the sensor elements makes a false measurement (e.g., a residual offset), an electrical event may not occur within the fixed-calibrated channel (e.g., the signal does not cross the threshold crossing level). In such a case, due to the false measurement, a threshold crossing may not exist within the fixed-calibrated channel, resulting in a deadlock of the fixed-calibrated channel (i.e., the fixed-calibrated channels cannot be used to determine the phase of the rotatable object). However, feedback from the self-calibrated channels can be used to correct the offset and/or generate events to recognize that, in fact, no vibration occurred (but, in fact, a false measurement occurred), and the fixed-calibrated channels can continue to be used to provide phase measurement information.

As such, some implementations described herein can increase the accuracy of determining a phase of a rotatable object and prevent failures or errors of systems associated with sensors inaccurately determining the phase of the rotatable object. Furthermore, some implementations described herein can conserve processing resources and/or communication resources used to correct errors or failures of a system associated with inaccurate determinations of a phase of a rotatable object. For example, when a false measurement is made and/or not corrected, errors and/or failures, which may be catastrophic, can occur within a system. In such cases, resources may be used to address the errors or failures. For example, processing resources may be used to troubleshoot the errors and/or failures, communication resources may be used to indicate the errors and/or failures, network resources may be used to remotely receive an indication of the errors and/or failures and/or address the errors and/or failures, and/or hardware resources may be used to replace the system itself. Accordingly, some implementations described herein can conserve resources by detecting and/or correcting false phase measurements of a rotatable object and providing accurate phase detection of the rotatable object.

Figure 1B:
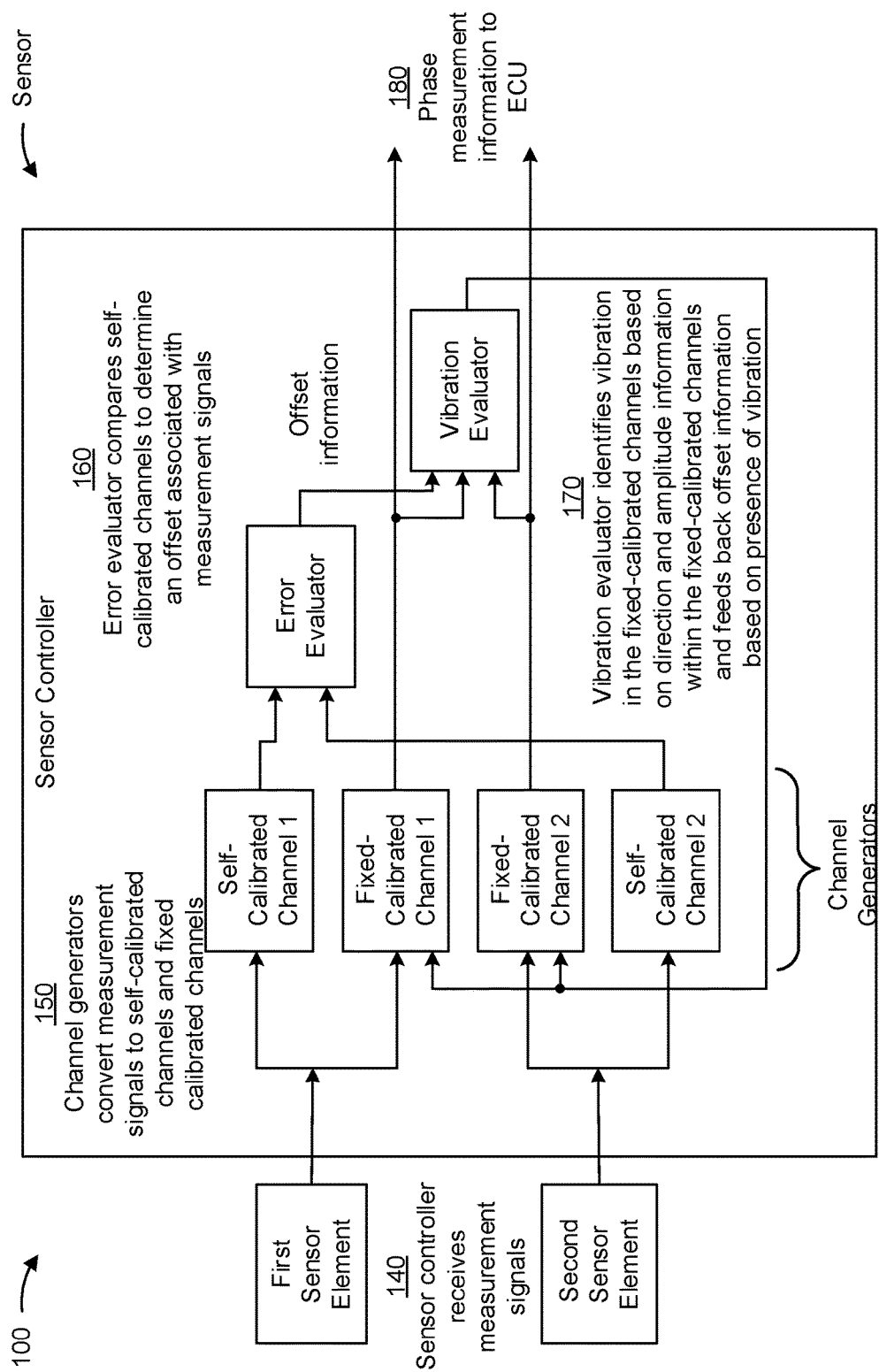

FIGS. 1A and 1B are diagrams of an overview of an example implementation 100 described herein. In example implementation 100, a sensor measures a magnetic field that indicates a phase (e.g., an angular position) of a rotatable object (e.g., based on measurements of a magnetic field surrounding the sensor and/or rotatable object). According to some implementations described herein, the sensor processes the measurements associated with the magnetic field and provides phase measurement information to an electronic control unit (ECU). The ECU may then determine the phase of the rotatable object based on the phase measurement information from the sensor.

As shown in FIG. 1A, and by reference number 110, at startup (e.g., just after the sensor has been activated to take measurements associated with the phase of the rotatable object), the sensor makes phase measurements of the rotatable object based on the magnetic field. The rotatable object may be any type of rotatable object (e.g., a gear, a wheel, a shaft, and/or the like) of any type of machine (e.g., a vehicle, an appliance, a robot, a manufacturing machine, and/or the like).

As further shown in FIG. 1A, and by reference number 120, during operation (e.g., while the sensor is making phase measurements of the rotatable object, while the sensor is activated or powered on, and/or the like), the sensor adjusts offsets of measurement signals and/or detects vibrations in the measurement signals (e.g., which may correspond to vibrations in a machine associated with the rotatable object). For example, the sensor may perform a self-calibration technique, as described herein, to adjust the offsets of corresponding measurement signals received from respective sensor elements of the sensor. Additionally, or alternatively, the sensor can determine vibrations from direction information and amplitude information determined from a fixed-calibration of the measurement signals.

As further shown in FIG. 1A, and by reference number 130, the ECU determines the phase of the rotatable object based on the offsets and phase vibrations sensed by the sensor. For example, the sensor can provide generated phase measurement information to the ECU. The phase measurement information may be signals from the sensor elements that are processed by the sensor controller based on detected vibrations and/or offsets in the phase measurements from the signal elements. Accordingly, the phase measurement information may include signals, adjusted by the sensor controller, that can enable the ECU to accurately determine the phase of the rotatable object regardless of any vibrations (e.g., detected by fixed-calibrated channels) or offsets (e.g., detected by self-calibrated channels) sensed by the sensor. Accordingly, based on the phase measurement information, the ECU can determine the phase of the rotatable object, even at startup (e.g., using stored offsets identified by the self-calibrated channels).

As shown in FIG. 1B, an example implementation of the sensor controller of example implementation 100 is shown. As shown by reference number 140, the sensor controller receives the measurement signals from a first sensor element and a second sensor element (which correspond to the sensor elements of FIG. 1A and may be referred to herein collectively as the sensor elements). In some implementations, the measurement signals may be analog signals (e.g., direct outputs from the sensor elements) or digital signals (e.g., that have been converted by an ADC). Accordingly, the measurement signals may have a maximum, a minimum, and a threshold crossing level (e.g., a zero-crossing level, a bias, and/or the like), which may be a value associated with the maximum and minimum amplitudes (e.g., an average) and may indicate a phase or period of the measurement signals.

As further shown in FIG. 1B, and by reference number 150, channel generators convert the measurement signals to self-calibrated and fixed-calibrated channels. For example, the sensor controller generates (e.g., using corresponding fixed-calibrated channel generators and self-calibrated channel generators) a first fixed-calibrated channel (fixed-calibrated channel 1) and a first self-calibrated channel (self-calibrated channel 1) from the measurement signal of the first sensor element and a second fixed-calibrated channel (fixed-calibrated channel 2) and a second self-calibrated channel (self-calibrated channel 2) from the measurement signal of the second sensor element.

As further shown in FIG. 1B, and by reference number 160, an error evaluator compares the self-calibrated channels to determine an offset associated with the measurement signals from the sensor elements. Offset information, from the error evaluator, may indicate whether an offset exists in the measurement signals, and, if so, the amplitude of the offset. As shown by reference number 170, a vibration evaluator identifies vibration in the fixed-calibrated channels based on the direction information and amplitude information within the fixed-calibrated channels and feeds back whether to adjust the offset of the fixed-calibrated channel based on the presence of a vibration. For example, if a vibration occurred, the vibration evaluator may prevent an offset adjustment (e.g., because the measured maximum and minimum of the signals to identify the offset were incorrect due to the presence of the vibration). On the other hand, if no vibration is detected, the vibration evaluator feeds back the offset in order to adjust the offset. As such, despite residual offsets occurring in the fixed-calibrated channels (e.g., due to false measurements or errors), the offset of the fixed-calibrated channel is adjusted using the offset information determined from the self-calibrated channels.

As further shown in FIG. 1B, and by reference number 180, the sensor controller sends phase measurement information to the ECU. The phase measurement information may include fixed-calibrated channels that have been adjusted based on detected vibrations and/or offsets in measurement signals of the sensor elements. Accordingly, the sensor controller can provide accurate, vibration robust information that accurately indicates the phase of the rotatable object of example implementation 100, using both fixed-calibrated channels and self-calibrated channels generated from measurement signals of the sensor elements.

As indicated above, FIGS. 1A and 1B are provided merely as an example. Other examples are possible and may differ from what was described with regard to FIGS. 1A and 1B.

Figure 2:
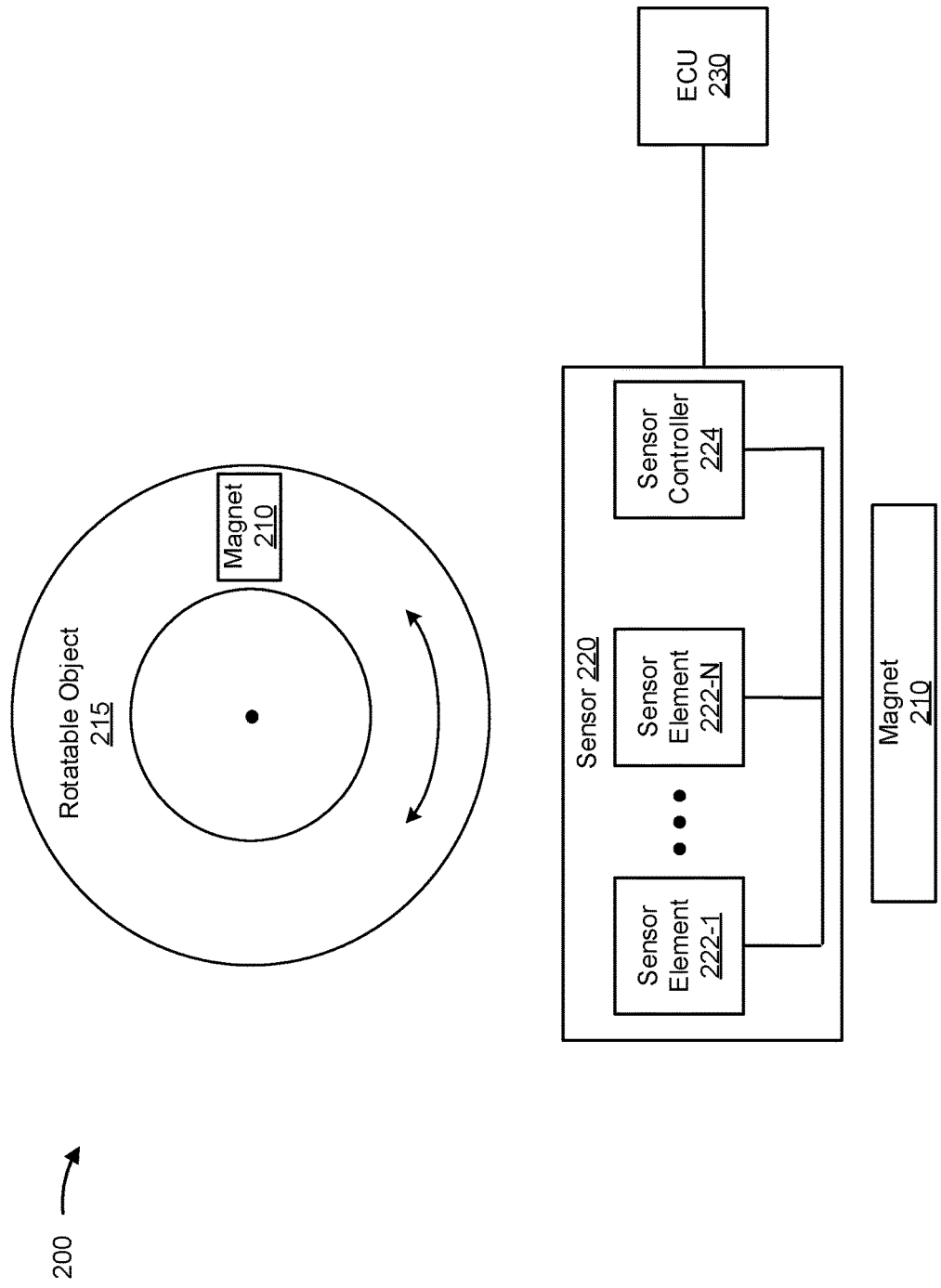
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a magnet 210, a rotatable object 215, a sensor 220 that includes one or more sensor elements 222-1 through 222-N (where N is an integer and N≥1) (hereinafter referred to collectively as "sensor elements 222," and individually as "sensor element 222") and a sensor controller 224, and an ECU 230.

Magnet 210 includes one or more magnets positioned to generate a magnetic field capable of being sensed by sensor 220. The magnetic field generated by magnet 210 may be affected and/or changed based on a position and/or rotation of rotatable object 215. Magnet 210 may be separate from rotatable object 215 (e.g., a back-bias magnet) and/or may be connected to, fixed to, and/or formed as part of rotatable object 215 (e.g., a diametrically magnetized magnet, a multipole magnet, and/or the like).

Rotatable object 215 can be any object (e.g., a wheel, a shaft, a gear, and/or the like) capable of rotating about a rotational axis. In some implementations, rotatable object 215 may be a part of a mechanical system of a machine (e.g., a vehicle, an appliance, a robot, a manufacturing machine, an industrial machine, an agricultural machine, and/or the like). Rotatable object 215 may have characteristics that affect or change a magnetic field of environment 200, which is sensed by sensor 220. For example, rotatable object 215 may be comprised of a particular material (e.g., metallic material, a magnetic material, a semi-magnetic material, and/or the like) and/or have a particular shape that affects the magnetic field. Furthermore, rotatable object 215 may alter or change the magnetic field based on the phase of rotatable object 215, such that sensor 220 may take phase measurements associated with rotatable object 215 and/or that ECU 230 may determine the phase of rotatable object 215.

Sensor 220 is one or more sensor devices (e.g., magnetic sensor devices) capable of sensing, processing, and/or generating information (e.g., provided within measurement signals) associated with a phase or position of rotatable object 215. Sensor element 222 includes one or more apparatuses for sensing one or more components of a magnetic field that may be used to determine the phase of rotatable object 215. Sensor element 222 may include a Hall-based sensor element that operates based on a Hall-effect. As another example, sensor element 222 may include a magneto-resistive based (MR-based) sensor element (e.g., a giant magneto-resistor (GMR), a tunnel magneto-resistor (TMR), and/or an anisotropic magneto-resistor (AMR), and/or the like), where the electrical resistance of the magneto-resistive material may depend on a strength and/or a direction of the magnetic field present at the sensor element 222. Here, sensor element 222 may operate based on an AMR effect, a GMR effect, a TMR effect, and/or the like. Sensor elements 222 may include differential sensor elements (e.g., configured as GMR/TMR full bridges, configured as differential hall probes, and/or the like). Each of sensor elements 222 may be configured to produce respective measurement signals. In some implementations, a pair of sensor elements 222 may produce phase-shifted (e.g., phase shifted by 90 degrees) measurement signals that can be used to indicated a direction of rotation of rotatable object. For example, if a phase of a first signal leads a phase of a second signal, then that may indicate a first direction of rotation (e.g., clockwise), and if the phase of the second signal leads the phase of the first signal, then that may indicate a second direction of rotation that is opposite to the first direction of rotation (e.g., counter clockwise).

Sensor controller 224 includes one or more circuits associated with processing measurement signals to generate and/or store phase measurement information associated with rotatable object 215. For example, sensor controller 224 may include an ADC, digital signal processor (DSP), one or more memories (e.g., a read only memory (ROM), (e.g., an electrically erasable programmable read-only memory (EEPROM)), a random access memory (RAM), a non-volatile memory (e.g., a flash memory, a magnetic memory, an optical memory, and/or the like)), and/or other components or circuits to process measurement signals from sensor elements 222. In some implementations, described herein, sensor controller 224 may generate one or more fixed-calibrated channels (or channels) and/or one or more self-calibrated channels from the measurement signals of sensor elements 222. Sensor controller 224 may include one or more channel generators, error evaluators, and/or vibration analyzers as described in connection with FIG. 1B.

ECU 230 includes one or more circuits associated with determining a phase, direction, and/or speed of rotatable object 215 and/or providing information associated with the phase and/or position of rotatable object 215. ECU 230 may be configured with mapping information associated with determining a phase of rotatable object 215 based on signals and/or phase measurement information from sensor 220. ECU 230 may store the mapping information in a memory element. The mapping information may include information associated with the phase of rotatable object 215 and signals or phase measurement information generated by sensor 220. The mapping information may include such information for multiple phases of rotatable object 215. In some implementations, ECU 230 may be configured with the mapping information during a manufacturing process associated with ECU 230 and/or a system associated with ECU 230, during a calibration process associated with sensor 220 and/or ECU 230, during a setup process associated with sensor 220 and/or ECU 230, and/or the like.

During operation, ECU 230 receives signals and/or phase measurement information from sensor 220. ECU 230 may then compare the signals and/or phase measurement information to the mapping information, and determine the phase of rotatable object 215 based on the comparison. For example, ECU 230 may identify amplitudes, frequencies, and/or phases of received signals included in the mapping information, that match (e.g., within a threshold or that satisfy a matching threshold) the received amplitudes, frequencies, and/or phases. In such a case, ECU 230 may determine the phase of object 215 as the phase corresponding to the matched mapping information.

In some implementations, ECU 230 may receive and/or process input signals from sensor 220, process the input signals (e.g., using an analog signal processor, a digital signal processor, etc.) to generate an output signal. ECU 230 may provide the output signal to one or more other devices or systems associated with ECU 230. For example, ECU 230 may receive one or more input signals from sensor 220 (e.g., from a digital signal processor (DSP) of sensor 220), and may use the one or more input signals to generate an output signal comprising the phase of rotatable object 215.

The number and arrangement of devices and networks shown in FIG. 2 are provided as an example. In practice, there may be additional devices and/or objects, fewer devices and/or objects, different devices and/or objects, or differently arranged devices and/or objects than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
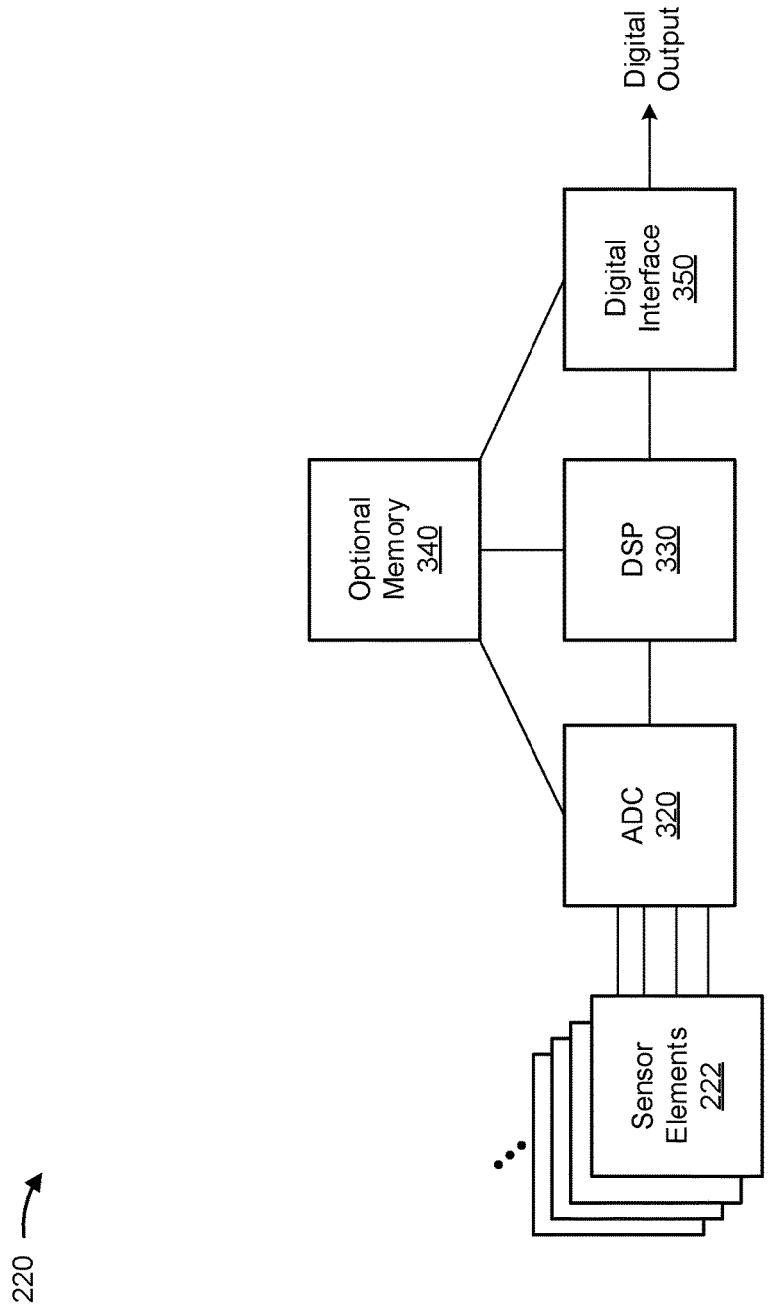
FIG. 3 is a diagram of example components of one or more devices of FIG. 2.

FIG. 3 is a diagram of example components of sensor 220 of environment 200. As shown, sensor 220 may include a set of sensor elements 222, an analog-to-digital convertor (ADC) 320, a digital signal processor (DSP) 330, an optional memory element 340, and a digital interface 350.

Sensor element 222 includes an element for sensing an in-plane component of a magnetic field (e.g., a component of the magnetic field that is substantially parallel to the main surface of sensor chip 212, such as a y-component or an x-component) present at sensor element 222. For example, sensor element 222 may include a Hall-based sensor element that operates based on a Hall-effect. As another example, sensor element 222 may include a MR-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensor element 222 may operate based on an anisotropic magnetoresistance (AMR) effect, a giant magnetoresistance (GMR) effect, a tunnel magnetoresistance (TMR) effect, and/or the like. As an additional example, sensor element 222 may include a variable reluctance (VR) based sensor element that operates based on induction. In some implementations, sensor chip 212 may include multiple sensing elements 215 (e.g., two or more sensing elements 215) arranged as described above.

In some implementations, one or more sensing elements 215 may be sensitive in a direction that is substantially parallel to a plane defined by a main surface of sensor chip 212 (e.g., an x-direction in sensor system 200, a y-direction in sensor system 200). In some implementations, two or more sensing elements 215 of sensor chip 212 may have a same direction of sensitivity. For example, a first sensor element 222 and a second sensor element 222 may both be sensitive in a same direction (e.g., the y-direction, the x-direction, a direction that is substantially parallel to the plane defined by the surface of sensor chip 212, and/or the like).

ADC 320 may include an analog-to-digital converter that converts an analog signal from sensing elements 215 to a digital signal. For example, ADC 320 may convert analog signals, received from the set of sensing elements 215, into digital signals to be processed by DSP 330. ADC 320 may provide the digital signals to DSP 330. In some implementations, sensor chip 212 may include one or more ADCs 320.

DSP 330 may include a digital signal processing device or a collection of digital signal processing devices. In some implementations, DSP 330 may receive digital signals from ADC 320 and may process the digital signals to form output signals (e.g., destined for a control device to which sensor chip 212 is connected), such as output signals associated with an amount of current measured as passing through a current medium.

Optional memory element 340 may include a read only memory (ROM) (e.g., an EEPROM), a random access memory (RAM), and/or another type of dynamic or static storage device (e.g., a flash memory, a magnetic memory, an optical memory, etc.) that stores information and/or instructions for use by sensor chip 212. In some implementations, optional memory element 340 may store information associated with processing performed by DSP 330. Additionally, or alternatively, optional memory element 340 may store configurational values or parameters for the set of sensing elements 215 and/or information for one or more other elements of sensor chip 212, such as ADC 320 or digital interface 350.

Digital interface 350 may include an interface via which sensor chip 212 may receive and/or provide information from and/or to another device, such as a control device. For example, digital interface 350 may provide the output signal, determined by DSP 330, to the control device and may further receive information from the control device.

The number and arrangement of components and elements shown in FIG. 3 are provided as an example. In practice, sensor chip 212 may include additional components and/or elements, fewer components and/or elements, different components and/or elements, or differently arranged components and/or elements than those shown in FIG. 3. Additionally, or alternatively, a set of components and/or a set of elements (e.g., one or more components or one or more elements) of sensor chip 212 may perform one or more functions described as being performed by another set of components or another set of elements of sensor chip 212.

Figure 4:
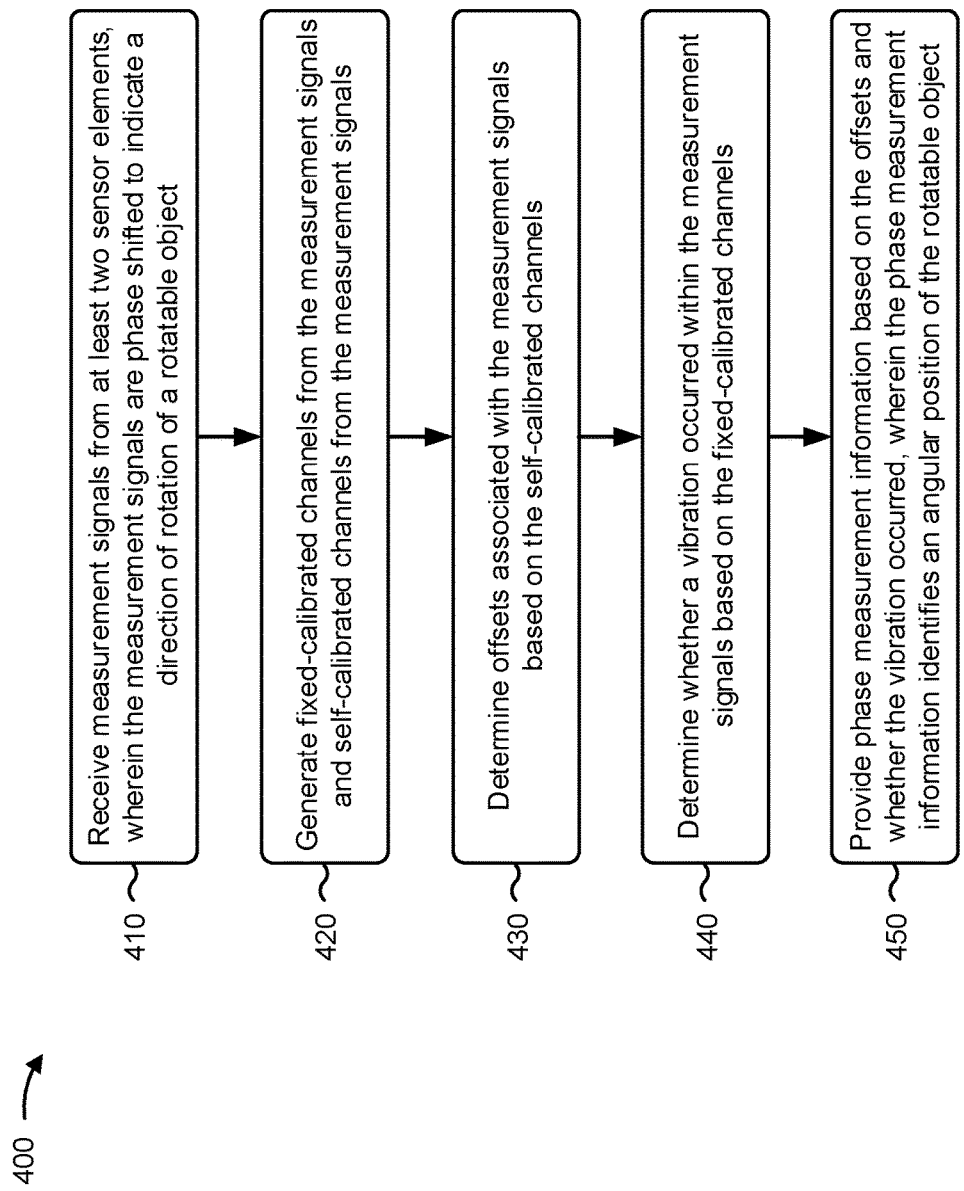
FIG. 4 is a flow chart of an example process associated with a rotation phase detection system.

FIG. 4 is a flow chart of an example process 400 associated with a rotational phase detection system. In some implementations, one or more process blocks of FIG. 4 may be performed by sensor controller 224. In some implementations, one or more process blocks of FIG. 4 may be performed by another device or a group of devices separate from or including sensor controller 224, such as sensor 220 (or a component of sensor 220 other than sensor controller 224) and/or ECU 230.

As shown in FIG. 4, process 400 may include receiving measurement signals from at least two sensor elements, wherein the measurement signals are phase shifted to indicate a direction of rotation of a rotatable object (block 410). For example, sensor controller 224 may receive measurement signals from sensor elements 222. In some implementations, sensor controller 224 may receive the measurement signals based on being powered on, based on being configured to receive measurement signals from sensor elements 222, based on sensor elements sensing a magnetic field associated with magnet 210 and/or rotatable object 215, based on instructions from ECU 230, and/or the like.

Measurement signals may be any signal (e.g., analog or digital) that may include information representative of a magnetic field associated with magnet 210 and/or rotatable object 215. The measurement signals may be sinusoidal corresponding to a rotation of rotatable object 215 and may include information indicating the speed and/or direction of rotation of rotatable object 215 (e.g., based on the amplitude, frequency, and/or phase of the signals). In some aspects, the measurements signals may be differential measurement signals. For example, the measurements signals may be configured to be complementary to one another and differentiate based on one or more characteristics (e.g., phase, amplitude, and/or the like). In some aspects, a phase shift between a pair of measurement signals, may indicate a direction of rotation of rotatable object 215 (e.g., which may be determined by ECU 230).

In some implementations, vibrations may be present within measurement signals. The vibrations may be anomalies within the measurement signal that may be caused by or indicative of a vibration within a machine associated with rotatable object 215. According to some implementations described herein, the vibrations can be detected and/or accounted for using fixed-calibration and self-calibration techniques.

In some implementations, the measurement signals may be offset from a threshold crossing level (e.g., of a fixed-calibrated channel). For example, the offset may correspond to the constant B in the following:

$$y(x)=\sin(x)+B \quad (1)$$

where B corresponds to a bias of the sine function in Equation 1. Accordingly, the offset in Equation 1 occurs at B. In some implementations, the offset from a threshold crossing level can be determined based on the maximum and minimum of a measurement signal (e.g., by averaging the maximum and minimum of a cycle of the measurement signal), which may be determined using self-calibration techniques, as described herein.

According to some implementations, sensor controller 224 receives measurement signals from corresponding sensor elements 222. For example, sensor controller 224 may receive a first measurement signal from a first sensor element 222-1 and a second measurement signal from a second sensor element 222-2.

In this way, sensor controller 224 may receive measurement signals from sensor elements 222 to permit sensor controller 224 to generate fixed-calibrated channels and/or self-calibrated channels from the measurement signals.

As further shown in FIG. 4, process 400 may include generating fixed-calibrated channels from the measurement signals and self-calibrated channels from the measurement signals (block 420). For example, sensor controller 224 may generate a first fixed-calibrated channel and first self-calibrated channel from a first sensor element 222-1 and a second fixed-calibrated channel and second self-calibrated channel from a second sensor element 222-2. In some implementations, sensor controller 224 may generate the fixed-calibrated channels and the self-calibrated channels based on receiving the fixed-calibrated channels, based on receiving the self-calibrated channels, based on being configured to generate the fixed-calibrated channels and/or self-calibrated channels, based on receiving configuration information (e.g., from ECU 230), and/or the like.

As described herein, a fixed-calibrated channel has a fixed threshold corresponding to the threshold crossing level of the signal. For example, the fixed-calibrated channel generators may set a fixed threshold for the threshold crossing level of a received signal, and phase measurements can be determined based on the measurement signal and the fixed threshold. In some implementations, the fixed threshold may be zero (e.g. a zero-crossing level that occurs when a sensor element makes a measurement of zero of a component of the magnetic field) or any other constant. For example, the fixed threshold may be configured to be zero or configured to be offset from zero based on a configuration of the sensor and/or sensor elements. According to some implementations described herein, a detected offset can be applied to the threshold. For example, an offset may be detected and/or determined from the fixed-calibrated channels themselves (e.g., based on a distance between a maximum or minimum of the fixed calibrated channels). Additionally, or alternatively, sensor controller 224 may determine that the offset is associated with fixed-calibrated channels based on the generated self-calibrated channels. The offset may be determined from analyzed maxima and minima of measurement signals as identified in the self-calibrated channels. As such, sensor controller 224 may apply the offset to and/or adjust the fixed-calibrated channels to be analyzed such that the fixed-calibrated channels include the offset. In such cases, when a vibration be excluded the fixed calibrated channels may include an offset to minimize any phase error within the fixed calibrated channels.

As described herein, a self-calibrated channel adjusts a crossing level of a measurement signal based on an analysis of the signal. For example, the self-calibrated channel generators may monitor a maximum and minimum amplitude of a measurement signal from one or more of the sensor elements and calculate an offset from a calibrated threshold crossing level of the signal (which may have been calibrated from a previously determined maximum and minimum amplitude of the signal). The calculated offset can be used to track the subsequently determined maximum and minimum amplitudes of the signal. Accordingly, the threshold crossing level can be adjusted under operation, as opposed to the fixed-calibrated channel generators that do not adjust the threshold crossing level. In some implementations, the self-calibrated channels may be used to prevent deadlock situations of the fixed-calibrated channels caused by residual offsets preventing signal crossings of the fixed threshold in the fixed-calibrated channels. For example, the offset determined from the self-calibrated channels can be applied to the fixed-calibrated channels to adjust the fixed-calibrated signals to accurately measure a phase of rotatable object 215, thus preventing the deadlock. Additionally, or alternatively, the self-calibrated channels may be used to determine an offset isn't to be added or applied to the fixed calibrated channels.

In this way, sensor controller 224 may generate fixed-calibrated channels and/or self-calibrated channels from the measurement signals to permit sensor controller 224 to determine offsets associated with the measurement signals and detect vibrations in the measurement signals.

As further shown in FIG. 4, process 400 may include determining offsets associated with the measurement signals based on the self-calibrated channels (block 430). For example, sensor controller 224 may determine the offset in measurement signals from sensor elements 222. Sensor controller 224 may determine an offset associated with a first measurement signal from a first sensor element 222-1 and an offset associated with a second measurement signal from a second sensor element 222-2. In some implementations, sensor controller 224 may determine the offset based on generating the self-calibrated channels.

In some implementations, sensor controller 224 may determine an offset of a measurement signal by calculating a value (e.g., an average) associated with a maximum amplitude and a minimum amplitude (e.g., of a cycle) of the measurement signal. In some implementations, the offset may be equal to the average of the maximum amplitude and the minimum amplitude. In some implementations, the offset may be relative to a crossing level associated with the measurement signal. For example, based on the calculated value, sensor controller 224 may determine a difference between the value and a crossing level associated with the measurement signal. For example, the crossing level may correspond to a previously determined value associated with a maximum amplitude and a minimum amplitude of a previous cycle of the measurement signal. Additionally, or alternatively, the crossing level may correspond to the threshold crossing level of the fixed-calibrated channels generated from the measurement signals.

In some implementations, the offsets determined from the self-calibrated channels may be applied to corresponding fixed-calibrated channels. For example, a first offset determined from a first self-calibrated channel from a measurement signal from a first sensor element 222-1 may be applied to a fixed threshold crossing level associated with a first fixed-calibrated channel generated from the first measurement signal. As such, sensor controller 224 may adjust fixed-calibrated channels generated from measurement signals of sensor elements 222 based on offsets determined from self-calibrated channels associated with the measurement signals.

In some implementations, the offsets determined from the self-calibrated channels may be used to prevent deadlock in the fixed-calibrated channels. For example, if one of the fixed-calibrated channels from one of sensor elements 222 includes a residual offset, a threshold crossing may not occur in the measurement signal from that sensor element 222. In such a case, this may indicate a vibration within the fixed-calibrated channel, even though such a vibration did not actually occur. This could cause ECU 230 to erroneously account for a vibration and/or erroneously indicate that a vibration occurred, resulting in a deadlock of sensor 220 and/or ECU 230 (e.g., a failure). However, the determined offset can be applied to the fixed-calibrated channel, which would then cause the signal to include a crossing (e.g., because the offset would adjust the fixed threshold of the fixed-calibrated channel). Accordingly, the offset can be used to account for errors in the fixed-calibrated channels.

In some implementations, sensor controller 224 may store settings corresponding to the offsets of the measurement signals (e.g., in one or more memories of the sensor). As such, if the sensor is shut down (e.g., powered off) or experiences a failure, upon a restart (or subsequent startup) sensor controller 224 may use the previously determined offsets during operation.

In this way, sensor controller 224 may determine offsets associated with measurement signals from sensor elements 222 to permit sensor controller 224 to adjust a threshold crossing level of fixed-calibrated channels of the measurement signals.

As further shown in FIG. 4, process 400 may include determining whether a vibration occurred within the measurement signals based on the fixed-calibrated channels (block 440). For example, sensor controller 224 may determine whether the vibrations occurred. In some implementations, sensor controller 224 may determine whether the vibration occurred based on generating the fixed-calibrated channels.

A vibration may correspond to a vibration (e.g., a jitter) within a signal and/or a vibration associated with a machine or system associated with rotatable object 215. According to some implementations, sensor controller 224 may analyze direction information and/or amplitude information in the fixed-calibrated channels to determine whether a vibration is present within one or more of the measurement signals. For example, if the amplitudes and/or directions indicated by the measurement signals vary from one another, a vibration may be indicated in the fixed-calibrated channels.

In some implementations, when a vibration is detected, sensor controller 224 may not adjust a threshold crossing level of a fixed-calibrated channel using an offset determined from a self-calibrated channel. For example, because there was a vibration, an offset measurement determined from a self-calibrated channel of a measurement signal may be inaccurate because the vibration may cause incorrect maxima or minima in the measurement signal. As such, sensor controller 224 may not use that offset to adjust the threshold crossing level of a fixed-calibrated channel to avoid using the erroneously calculated offset.

In this way, sensor controller 224 may detect whether a vibration occurred within the measurement signals to permit sensor controller 224 to provide phase measurement information that indicates an accurate phase of rotatable object 215.

As further shown in FIG. 4, process 400 may include providing phase measurement information based on the offset and whether the vibration occurred, wherein the phase measurement information identifies a phase of the rotatable object (block 450). For example, sensor controller 224 may provide phase measurement information to ECU 230. In some implementations, sensor controller 224 may provide phase measurement information based on determining an offset associated with self-calibrated channels associated with measurement signals and/or detecting whether a vibration occurred within the measurement signals based on fixed-calibrated channels.

Phase measurement information may be included within a signal sent from sensor 220 (e.g., via sensor controller 224) to ECU 230. The phase measurement information may correspond to one or more fixed-calibrated channels that have been adjusted according to an offset determined from self-calibrated channels of the measurement signals from sensor elements 222. For example, when no vibration is detected within the fixed-calibrated channel, the offset determined from the self-calibrated channels may be applied to the fixed-calibrated channels. Additionally, or alternatively, when a vibration is detected within the fixed-calibrated channel, the offset may not be applied to the fixed-calibrated channel (e.g., because the offset may be determined based on incorrect maxima and/or minima of the measurement signal). However, as mentioned above, the offset may be used to prevent a deadlock situation in the event of erroneous determinations of vibrations.

Accordingly, the phase measurement information may provide measurement information associated with measurement signals from sensor elements 222 that accounts for both detected vibrations and offsets in the measurement signals. Accordingly, the phase measurement information can be robust against vibrations while providing accurate measurement information to enable ECU 230 to accurately determine the phase of rotatable object 215.

In this way, sensor controller 224 may provide phase measurement information to ECU 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Accordingly, examples herein provide a sensor (e.g., a speed sensor) that uses multiple channels and multiple switching techniques to determine whether an offset and/or vibration exists within measurement signals. The sensor accounts for the offset and/or vibrations to provide accurate phase measurement information to an ECU, to enable the ECU to accurately determine the phase of a rotatable object. As such, errors, failures, and/or shutdowns costing time, processing resources, communication resources, network resources, hardware resources, and/or the like, can be avoided using the systems and/or processes described herein.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sensor device, comprising:
   a first sensor element to sense a magnetic field associated with a rotatable object;
   a second sensor element to sense the magnetic field; and
   a sensor controller, communicatively coupled to the first sensor element and the second sensor element, to:
   receive a first measurement signal from the first sensor element;
   receive a second measurement signal from the second sensor element;
   generate a first fixed-calibrated channel from the first measurement signal;
   generate a second fixed-calibrated channel from the second measurement signal;
   generate a first self-calibrated channel from the first measurement signal;
   generate a second self-calibrated channel from the second measurement signal;
   determine an offset associated with the first measurement signal and an offset associated with the second measurement signal based on the first self-calibrated channel and the second self-calibrated channel, respectively;
   determine whether a vibration occurred based on the first fixed-calibrated channel or the second fixed-calibrated channel; and
   provide phase measurement information based on the offset associated with the first measurement signal, the offset associated with the second measurement signal, and whether the vibration occurred,
wherein the phase measurement information indicates a phase of the rotatable object.

2. The sensor device of claim 1, wherein the sensor controller is to:
apply the offset associated with the first measurement signal to the first fixed-calibrated channel; and
apply the offset associated with the second measurement signal to the second fixed-calibrated channel.

3. The sensor device of claim 1, wherein the sensor controller, when determining whether the vibration occurred, is to:
analyze direction information and amplitude information in the first fixed-calibrated channel and the second fixed-calibrated channel.

4. The sensor device of claim 1, wherein the sensor controller,
when generating the first self-calibrated channel, is to:
determine a first value of a maximum and a minimum of the first measurement signal, and
adjust a crossing level associated with the first measurement signal based on the first value; and
when generating the second self-calibrated channel, is to:
determine a second value of a maximum and a minimum of the second measurement signal, and
adjust a crossing level associated with the second measurement signal based on the second value.

5. The sensor device of claim 1, wherein the sensor controller,
when no vibration is detected, is to:
adjust a first threshold crossing level associated with the first fixed-calibrated channel based on the offset associated with the first measurement signal, and
adjust a second threshold crossing level associated with the second fixed-calibrated channel based on the offset associated with the second measurement signal; or
when a vibration is detected, is to:
prevent an adjustment to the first threshold crossing level, and
prevent an adjustment to the second threshold crossing level.

6. The sensor device of claim 1, wherein the sensor controller is to:
store the offset associated with the first measurement signal and the offset associated with the second measurement signal to enable the offset associated with the first measurement signal to be applied to the first fixed-calibrated channel and the offset associated with the second measurement signal to be applied to the second fixed-calibrated channel during a startup of the sensor device.

7. The sensor device of claim 1, wherein the phase measurement information includes the first fixed-calibrated channel, adjusted based on the offset associated with the first measurement signal, and the second fixed-calibrated channel, adjusted based on the offset associated with the second measurement signal.

8. The sensor device of claim 1, wherein the first measurement signal and the second measurement signal are differential measurement signals.

9. A system comprising:
a sensor device comprising:
a first sensor element configured to sense a magnetic field associated with a magnet and a rotatable object,
wherein the first sensor element is configured to generate a first measurement signal based the sensed magnetic field;
a second sensor element, configured to measure the magnetic field associated with the magnet and the rotatable object,
wherein the second sensor element is configured to generate a second measurement signal based on the sensed magnetic field,
wherein the second measurement signal is phase shifted relative to the first measurement signal; and
a sensor controller configured to:
receive the first measurement signal from the first sensor element;
receive the second measurement signal from the second sensor element;
generate a first fixed-calibrated channel from the first measurement signal;
generate a second fixed-calibrated channel from the second measurement signal;
generate a first self-calibrated channel from the first measurement signal;
generate a second self-calibrated channel from the second measurement signal;
determine an offset associated with the first measurement signal and an offset associated with the second measurement signal based on the first self-calibrated channel and the second self-calibrated channel, respectively;
determine whether a vibration occurred based on the first fixed-calibrated channel or the second fixed-calibrated channel; and
generate phase measurement information based on the offset associated with the first measurement signal, the offset associated with the second measurement signal, and whether the vibration occurred in the first measurement signal or the second measurement signal,
wherein the phase measurement information indicates a phase of the rotatable object; and
an electronic control unit configured to determine the phase of the rotatable object based on the phase measurement information.

10. The system of claim 9, wherein the sensor controller is configured to:
apply the offset associated with the first measurement signal to the first fixed-calibrated channel and the offset associated with the second measurement signal to the second fixed-calibrated channel.

11. The system of claim 10, wherein the offset associated with the first measurement signal is applied to the first fixed-calibrated channel and the offset associated with the second measurement signal is applied to the second fixed-calibrated channel when no vibration is detected.

12. The system of claim 9, wherein the second measurement signal is phase shifted 90 degrees from the first measurement signal.

13. The system of claim 9, wherein the first sensor element and the second sensor element are both magneto-resistive based (MR-based) sensor elements, or the first sensor element and the second sensor element are both Hall-based sensor elements.

14. The system of claim 9, wherein the magnet comprises at least one of:
   a back-bias magnet that is not attached to or formed as part of the rotatable object, or
   a magnet that is attached to or formed as part of the rotatable object.

15. A method, comprising:
   receiving, by a sensor device, differential measurement signals from at least two sensor elements,
      wherein the differential measurement signals correspond to measurements of a magnetic field and are phase-shifted to indicate a direction of rotation of a rotatable object;
   generating, by the sensor device, fixed-calibrated channels from the differential measurement signals,
   generating, by the sensor device, self-calibrated channels from the differential measurement signals;
   determining, by the sensor device, offsets associated with the differential measurement signals based on the self-calibrated channels;
   determining, by the sensor device, whether a vibration occurred within the differential measurement signals based on the fixed-calibrated channels; and
   providing, by the sensor device, phase measurement information based on the offsets and whether the vibration occurred,
      wherein the phase measurement information identifies a phase of the rotatable object.

16. The method of claim 15, further comprising:
   storing the offsets associated with the differential measurement signals to enable the offsets to be applied to the fixed-calibrated channels during a startup of the sensor device.

17. The method of claim 15, further comprising:
   applying the offsets associated with the differential measurement signals to corresponding ones of the fixed-calibrated channels.

18. The method of claim 15, wherein generating the fixed-calibrated channels comprises:
   generating the fixed-calibrated channels to include a threshold crossing level associated with the differential measurement signals.

19. The method of claim 15, wherein generating the self-calibrated channels comprises:
   determining values based on corresponding maximums and minimums of the differential measurement signals; and
   generating the self-calibrated channels based on the values,
      wherein the offsets are based on the values.

20. The method of claim 15, wherein the magnetic field is generated by a magnet associated with the rotatable object,
   wherein the magnet is associated with the rotatable object based on being attached to or formed as part of the rotatable object, or being associated with a same machine as the rotatable object.

* * * * *